(12) United States Patent
Renke

(10) Patent No.: US 10,496,970 B2
(45) Date of Patent: Dec. 3, 2019

(54) ANIMATION MANAGEMENT IN APPLICATIONS

(71) Applicant: Square, Inc., San Francisco, CA (US)

(72) Inventor: Christopher Philip Renke, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 738 days.

(21) Appl. No.: 14/982,994

(22) Filed: Dec. 29, 2015

(65) Prior Publication Data

US 2017/0185983 A1  Jun. 29, 2017

(51) Int. Cl.
*G06Q 20/20* (2012.01)
*G06F 3/0484* (2013.01)
*G06T 13/80* (2011.01)
*G06Q 30/06* (2012.01)
*G06Q 50/12* (2012.01)

(52) U.S. Cl.
CPC ........... *G06Q 20/20* (2013.01); *G06F 3/0484* (2013.01); *G06Q 30/0641* (2013.01); *G06Q 50/12* (2013.01); *G06T 13/80* (2013.01); *G06T 2200/24* (2013.01)

(58) Field of Classification Search
None
See application file for complete search history.

(56) References Cited

U.S. PATENT DOCUMENTS

| | | |
|---|---|---|
| 6,507,352 B1 | 1/2003 | Cohen et al. |
| 7,464,334 B2 | 12/2008 | Miller et al. |
| 7,689,409 B2 | 3/2010 | Heinecke |
| 8,078,507 B1 | 12/2011 | Rao et al. |
| 8,542,195 B2 | 9/2013 | Bi et al. |
| 8,701,004 B2 | 4/2014 | Hoerentrup et al. |
| 8,944,322 B2 | 2/2015 | White |
| 8,985,442 B1 | 3/2015 | Zhou et al. |
| 9,105,026 B1 | 8/2015 | Edwards |
| 9,129,274 B1 | 9/2015 | Mocko et al. |
| 9,164,982 B1 | 10/2015 | Kaeser |
| 9,170,826 B2 | 10/2015 | Brunswig et al. |

(Continued)

FOREIGN PATENT DOCUMENTS

| | | | | |
|---|---|---|---|---|
| EP | 2 590 391 A2 | 5/2013 | | |
| EP | 2590391 | * 8/2013 | ............ | H04M 1/725 |

(Continued)

OTHER PUBLICATIONS

International Search Report and Written Opinion for International Patent Application No. PCT/US2016/068748, dated Feb. 16, 2017.

(Continued)

*Primary Examiner* — Nathan C Uber
*Assistant Examiner* — Denisse Y Ortiz Roman
(74) *Attorney, Agent, or Firm* — Lee & Hayes, P.C.

(57) ABSTRACT

Techniques and arrangements for managing animations (e.g., chrome) on an application of a computing device are described. The application may dynamically adjust the number of animations to process information at a faster and/or slower rate. The application may adjust the number of animations based on various factors, such as a rate of input events, a rate of outbound signals, a type of user, an experience level of a user, a time of day, a time of year, and/or other factors.

20 Claims, 8 Drawing Sheets

(56) References Cited

U.S. PATENT DOCUMENTS

| | | |
|---|---|---|
| 9,262,407 B1 | 2/2016 | Ermann et al. |
| 9,304,664 B2 | 4/2016 | Hoerentrup et al. |
| 9,324,065 B2 | 4/2016 | Mocko et al. |
| 9,368,021 B2 | 6/2016 | Touloumtzis |
| 9,418,139 B2 | 8/2016 | Moulinier et al. |
| 9,582,570 B2 | 2/2017 | Zheng et al. |
| 9,699,610 B1 | 7/2017 | Chicoine et al. |
| 9,881,287 B1 | 1/2018 | Edwards |
| 2002/0133523 A1 | 9/2002 | Ambler et al. |
| 2002/0153414 A1 | 10/2002 | Stoutenburg et al. |
| 2002/0156683 A1 | 10/2002 | Stoutenburg et al. |
| 2002/0180868 A1 | 12/2002 | Lippert et al. |
| 2003/0009694 A1 | 1/2003 | Wenocur et al. |
| 2003/0046526 A1 | 3/2003 | Zhang et al. |
| 2003/0132298 A1 | 7/2003 | Swartz et al. |
| 2003/0144922 A1 | 7/2003 | Schrantz |
| 2004/0102244 A1 | 5/2004 | Kryuchkov et al. |
| 2004/0172236 A1 | 9/2004 | Fraser |
| 2005/0204332 A1 | 9/2005 | Krishnan et al. |
| 2006/0020469 A1 | 1/2006 | Rast |
| 2006/0072136 A1 | 4/2006 | Hodder et al. |
| 2006/0136220 A1 | 6/2006 | Gurram et al. |
| 2006/0210026 A1 | 9/2006 | Duplessis et al. |
| 2006/0224438 A1 | 10/2006 | Obuchi et al. |
| 2006/0230267 A1 | 10/2006 | Mathew et al. |
| 2007/0017971 A1 | 1/2007 | Im |
| 2007/0174140 A1 | 7/2007 | Noonan et al. |
| 2007/0230787 A1 | 10/2007 | Belitskaya et al. |
| 2007/0288450 A1 | 12/2007 | Datta et al. |
| 2008/0027815 A1 | 1/2008 | Johnson et al. |
| 2008/0048880 A1 | 2/2008 | Strickland et al. |
| 2008/0121690 A1 | 5/2008 | Carani et al. |
| 2008/0122656 A1 | 5/2008 | Carani et al. |
| 2008/0136658 A1 | 6/2008 | Brask |
| 2009/0005072 A1 | 1/2009 | Forstall et al. |
| 2009/0077464 A1 | 3/2009 | Goldsmith et al. |
| 2009/0119092 A1 | 5/2009 | Balasubramanyan et al. |
| 2009/0144650 A1 | 6/2009 | Yoon |
| 2009/0259778 A1 | 10/2009 | Burge |
| 2010/0007603 A1 | 1/2010 | Kirkup |
| 2010/0057620 A1 | 3/2010 | Li et al. |
| 2010/0073336 A1 | 3/2010 | Lee et al. |
| 2010/0081475 A1 | 4/2010 | Chiang et al. |
| 2010/0088632 A1 | 4/2010 | Knowles et al. |
| 2010/0156939 A1 | 6/2010 | Lee |
| 2010/0159996 A1 | 6/2010 | Rider et al. |
| 2010/0182135 A1 | 7/2010 | Moosavi |
| 2010/0197352 A1 | 8/2010 | Runstedler et al. |
| 2011/0087990 A1 | 4/2011 | Ng et al. |
| 2011/0090147 A1 | 4/2011 | Gervais et al. |
| 2011/0220712 A1 | 9/2011 | Nakaeda |
| 2012/0010886 A1 | 1/2012 | Razavilar |
| 2012/0029691 A1 | 2/2012 | Mockus et al. |
| 2012/0050198 A1 | 3/2012 | Cannon |
| 2012/0078741 A1 | 3/2012 | DeLine |
| 2012/0081277 A1 | 4/2012 | de Paz |
| 2012/0088544 A1 | 4/2012 | Bentley et al. |
| 2012/0095821 A1* | 4/2012 | Fuquen .................. G06Q 30/02 705/14.23 |
| 2012/0151415 A1 | 6/2012 | Park et al. |
| 2012/0154293 A1 | 6/2012 | Hinckley et al. |
| 2012/0197740 A1 | 8/2012 | Grigg et al. |
| 2012/0215648 A1 | 8/2012 | Rose et al. |
| 2012/0256959 A1 | 10/2012 | Ye et al. |
| 2012/0260218 A1 | 10/2012 | Bawel |
| 2012/0290287 A1 | 11/2012 | Fux et al. |
| 2012/0290435 A1* | 11/2012 | Trotman ................ G06Q 30/02 705/26.7 |
| 2013/0132091 A1 | 5/2013 | Skerpac |
| 2013/0226800 A1 | 8/2013 | Patel et al. |
| 2014/0002407 A1 | 1/2014 | Badaye et al. |
| 2014/0012689 A1 | 1/2014 | Henderson et al. |
| 2014/0028541 A1 | 1/2014 | Truong et al. |
| 2014/0039872 A1 | 2/2014 | Patel |
| 2014/0075286 A1 | 3/2014 | Harada |
| 2014/0152507 A1 | 6/2014 | McAllister |
| 2014/0236568 A1 | 8/2014 | Satpute |
| 2015/0001291 A1 | 1/2015 | Govindarajan et al. |
| 2015/0025967 A1 | 1/2015 | Ellison |
| 2015/0194024 A1 | 7/2015 | Govindarajan et al. |
| 2015/0199882 A1 | 7/2015 | Fernando et al. |
| 2015/0206128 A1 | 7/2015 | Torossian et al. |
| 2015/0220217 A1 | 8/2015 | Alshafai |
| 2016/0051067 A1 | 2/2016 | Law et al. |
| 2016/0124627 A1 | 5/2016 | Beatty et al. |
| 2016/0125449 A1 | 5/2016 | Beatty et al. |
| 2016/0148182 A1 | 5/2016 | Craine et al. |
| 2017/0091765 A1 | 3/2017 | Llyod et al. |
| 2017/0262892 A1 | 9/2017 | Fernando et al. |
| 2018/0056179 A1 | 3/2018 | Rose et al. |
| 2018/0150815 A1 | 5/2018 | Mocko et al. |

FOREIGN PATENT DOCUMENTS

| | | |
|---|---|---|
| JP | H10-011660 A | 1/1998 |
| JP | 2001-118147 A | 4/2001 |
| JP | 2001-256559 A | 9/2001 |
| JP | 2003-272047 A | 9/2003 |
| JP | 2009-503652 A | 1/2009 |
| JP | 2012-178011 A | 9/2012 |
| JP | 2013-041460 A | 2/2013 |
| WO | 2013/055758 A1 | 4/2013 |
| WO | 2015/191468 A1 | 12/2015 |
| WO | 2017/117145 A1 | 7/2017 |

OTHER PUBLICATIONS

Evans, S.D., "[Python] rotate( ) in Tkinter-Grokbase," grokbase.com, dated Dec. 6, 2000, Retrieved from internet URL: http://grokbase.com/t/python/python-list/00c6g9dgz1/rotate-in-tkinter, on Jan. 7, 2015, pp. 1-2.

Non Final Office Action dated Feb. 13, 2015, for U.S. Appl. No. 14/042,525, of Edwards, T.J., filed Sep. 30, 2013.

Notice of Allowance dated May 5, 2015, U.S. Appl. No. 14/301,621, of Mocko, C.L., et al., filed Jun. 11, 2014.

Notice of Allowance dated May 11, 2015, for U.S. Appl. No. 14/042,525, of Edwards, T.J., filed Sep. 30, 2013.

Non Final Office Action dated Sep. 9, 2015, for U.S. Appl. No. 14/301,603, of Mocko, C.L., et al., filed Jun. 11, 2014.

Notice of Allowance dated Dec. 21, 2015, for U.S. Appl. No. 14/301,603, of Mocko, C.L., et al., filed Jun. 11, 2014.

Notice of Acceptance for Australian Patent Application No. 2015274903, dated Feb. 22, 2017.

Examination Report No. 1 for Australian Patent Application No. 2017202569, dated Apr. 28, 2017.

Non-Final Office Action dated May 25, 2017, for U.S. Appl. No. 14/749,980, of Edwards, T.J., filed Jun. 25, 2015.

Notice of Allowance dated Sep. 12, 2017, for U.S. Appl. No. 14/749,980, of Edwards, T.J., filed Jun. 25, 2015.

English-language translation of Notification of Reasons for Refusal for Japanese Patent Application No. 2017-517195, dated Jan. 4, 2018.

Non-Final Office Action dated Apr. 23, 2018, for U.S. Appl. No. 15/011,806, of Mocko, C.L., et al., filed Feb. 1, 2016.

Examination Report No. 2 for Australian Patent Application No. 2017202569, dated Apr. 26, 2018.

English-language translation of Decision to Grant for Japanese Patent Application No. 2017-517195, dated Jul. 2, 2018.

Non-Final Office Action dated Jul. 27, 2018, for U.S. Appl. No. 15/389,022, of Hafemann, S.M., filed Dec. 22, 2016.

Final Office Action dated Aug. 31, 2018, for U.S. Appl. No. 15/011,806, of Mocko, C.L., et al., filed Feb. 1, 2016.

Office Action for European Patent Application No. 15807035.9, dated Oct. 17, 2018.

Final Office Action dated Nov. 30, 2018, for U.S. Appl. No. 15/389,022, of Hafemann, S.M., filed Dec. 22, 2016.

Advisory Action dated Dec. 13, 2018, for U.S. Appl. No. 15/011,806, of Mocko, C.L., et al., filed Feb. 1, 2016.

(56) References Cited

OTHER PUBLICATIONS

Office Action for European Patent Application No. 16826626.0, dated Jan. 4, 2019.
Notice of Allowance dated Jan. 22, 2019, for U.S. Appl. No. 15/011,806, of Mocko, C.L., et al., filed Feb. 1, 2016.
International Search Report and Written Opinion for International Application No. PCT/US2015/034727, dated Sep. 3, 2015.
Extended European Search Report for European Patent Application No. 15807035.9, dated Dec. 13, 2017.

* cited by examiner

ANIMATION MANAGEMENT IN APPLICATIONS

BACKGROUND

Mobile devices are ubiquitous in society today. Typically, mobile devices contain applications that allow users to conduct various activities on the mobile devices. For instance, a merchant may use a point-of-sale (POS) application on a mobile device, such as a mobile POS device, to engage in transactions with customers at various locations. Applications may include various animations, such as drop-down menus, pictures, motions, sounds, etc. The animations provide an enhanced user experience by including more information in an aesthetically pleasing manner. However, the amount of animation may be inversely proportional to the speed of the application. Thus, because the enhanced user experience may require more time to process due to the animation display time, the enhanced user experience may come at a cost of slower processing speeds. For various users, such as the merchant using a mobile POS device, the animation may be highly desirable, but may be too costly when the merchant wants to conduct transactions at a high rate.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
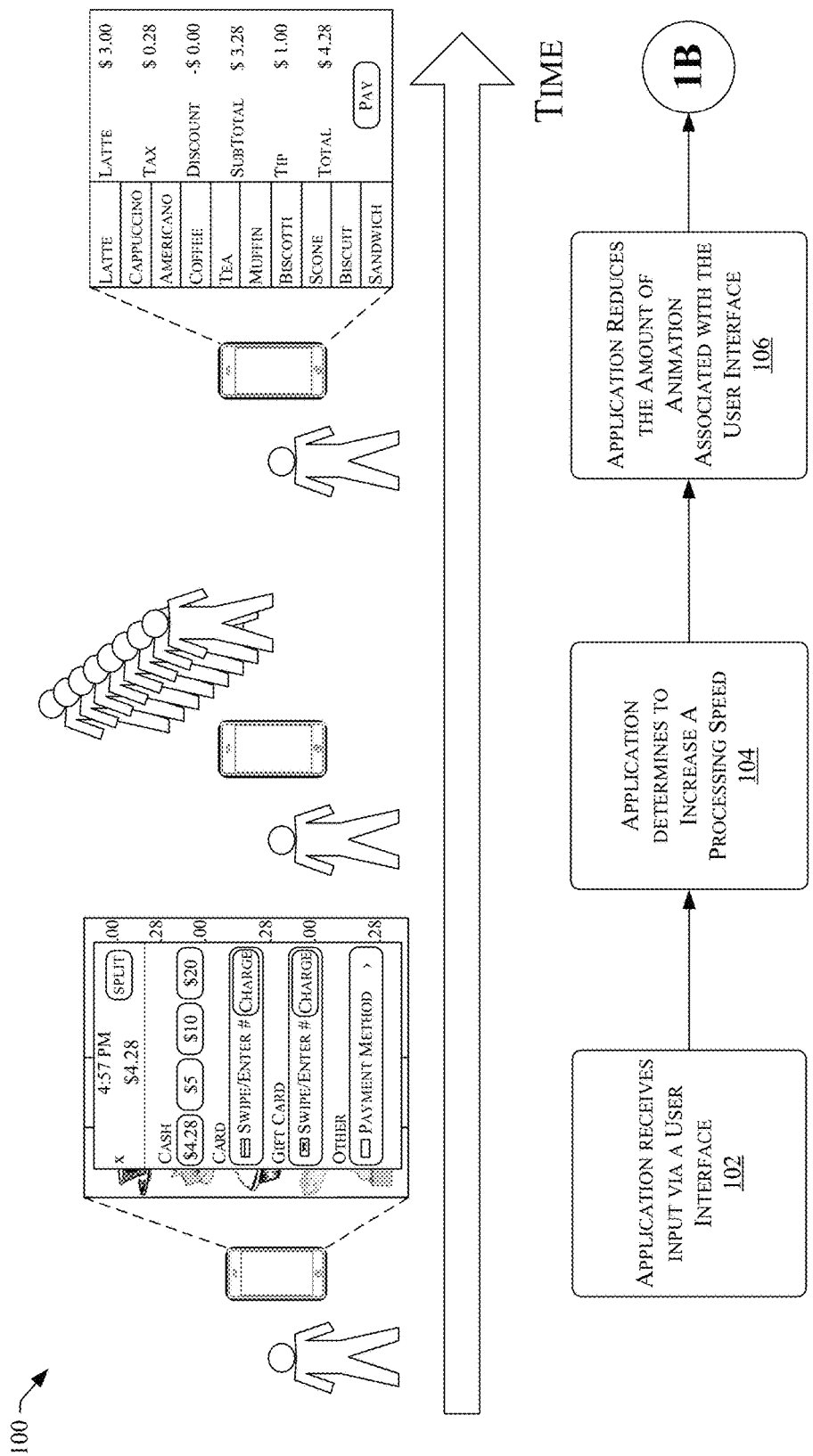
FIGS. 1A-B collectively illustrate a process for dynamically managing animations on a mobile device.

Some implementations described herein include techniques and arrangements for managing animations on an application of a computing device. In some instances, the application may be a transaction application (e.g., point-of-sale application) operating on a point-of-sale (POS) device. The application may dynamically adjust the animations (e.g., the number of animations, the amount of graphics associated with an animation, etc.) to process information at a faster and/or slower rate. The application may adjust the animations based on an average rate of transactions processed over a pre-determined time, a rate of recognized input events, a type of user, an experience level of a user, a time of day, a time of year, or other factors. In some examples, the application may adjust the number of animations for a designated time interval. For example, a merchant application operating on a POS device may have a history of processing a relatively large number of transactions (e.g., more than a threshold) between 4 pm and 6 pm on weekdays. Consequently, the merchant application may decrease the number of animations in anticipation of processing transactions at a higher rate during the busy time.

A user profile may be maintained with a list of user specific criteria. The user profile may be used to control and/or adjust animations on applications. In some instances, a user may designate the criteria, and/or may update the user profile periodically. The user profile may include various sub-user profiles, and/or may vary animation levels based on the particular person operating the POS device. For instance, a merchant may maintain a user profile that includes one or more sub-profiles for employees of the merchant. Thus, each employee may adjust a baseline animation level (e.g., a default number of animations that may occur) corresponding to the employee. For example, a new employee on a merchant profile may desire more information and may set the animation at a relatively high level (e.g., specify that more than a threshold number of animations may occur). However, a more experienced employee on the merchant profile may not need as much information. Thus, the more experienced employee may set the baseline animation to a lower level in order to process transactions faster.

In many instances, the adjustment of animation (e.g., adjustment of chrome) as described herein may increase the efficiency of applications running on a mobile device (e.g., reduce processing, reduce battery usage, etc.). Additionally, the adjustment of animation may enhance a user experience by recognizing a desire to increase or decrease a processing speed, and adjust the animation to a lower or higher level to meet that desire. Further, in many instances (e.g., in merchant application examples), the adjustment in animation level may result in an improvement to the technology and/or technical field of processing transactions.

For discussion purposes, example implementations, such as a merchant POS device running a merchant application, are described below with reference to the corresponding figures. However, implementations herein are not limited to the merchant POS device running a merchant application. The techniques discussed herein may be extended to other environments, other system architectures, other types of applications, and so forth, as will be apparent to those of skill in the art in light of the disclosure herein.

Figure 1B:
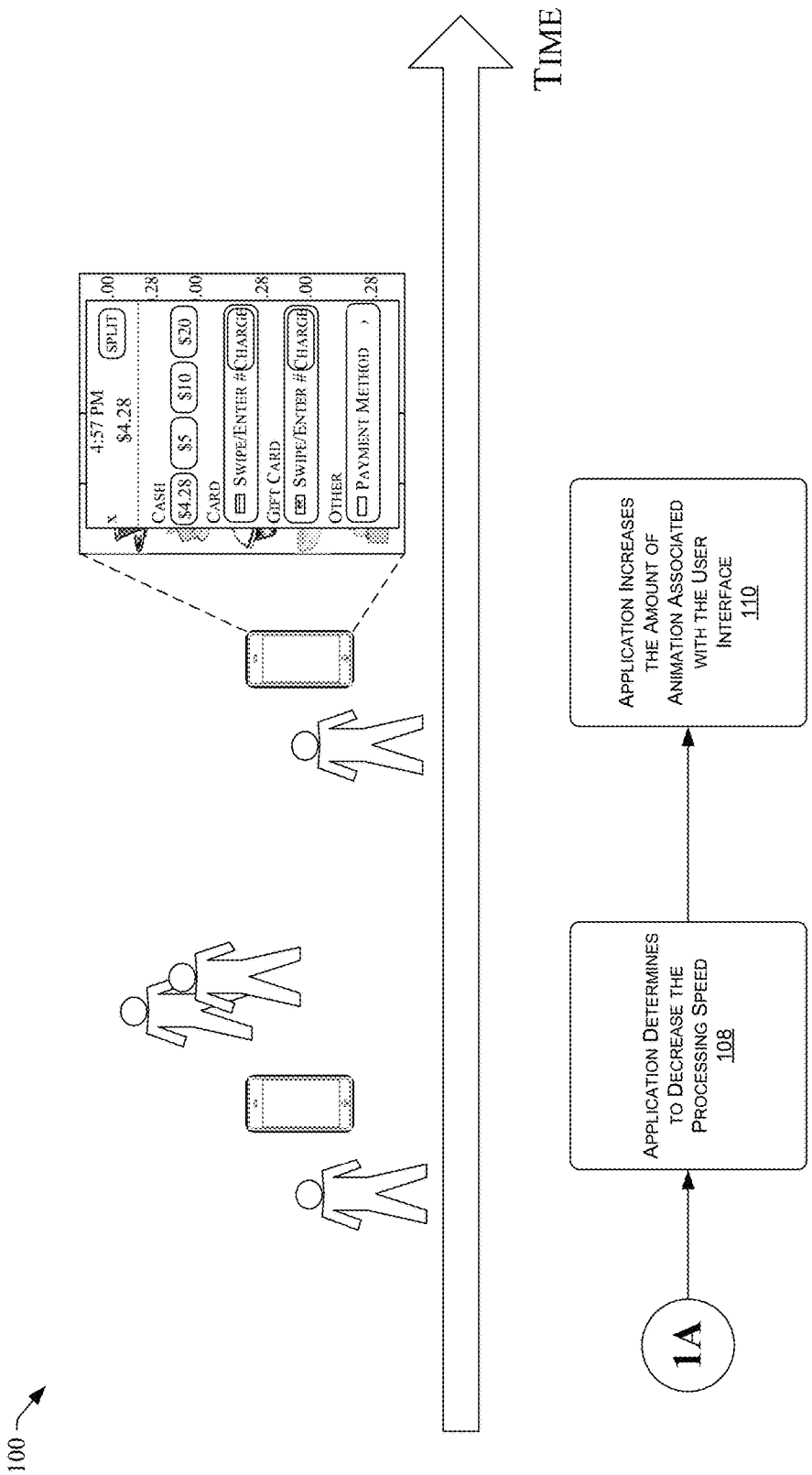

FIGS. 1A-B collectively illustrate a process 100 for dynamically managing animations on an application of a device.

FIG. 1A illustrates, at 102, an application of a mobile device receives input via a user interface of the application. In various examples, the application may comprise a merchant application configured to facilitate transactions between a merchant and one or more customers. In some examples, the application may include two or more applets, each applet being configured to perform a different function. For example, a merchant application for a restaurant may include a hostess applet to assist in seating customers, a wait-staff applet to provide desired food and drink to the customers, and a cook applet to report a food readiness status.

The application may be configured to process input received via the user interface. The input may include input events, e.g., a user of the mobile device touching or simulating a touch by placing a finger in proximity to a presence-sensitive display, or by using a keyboard or other input mechanism. In various examples, the input may comprise a series of input events related to processing transactions via a merchant application.

In some examples, the application and/or the applet of the application may be configured to present animations in response to various input events. The animations can include any visual and/or audio element. For example, the animations may comprise movements of graphical items (e.g., sliding, fading in, fading out, dropping down, raising up, rotating a graphical icon, graphical menus, or other items), sounds, and/or other information pertaining to the function and/or aesthetics of the application and/or the applet. In some instances, the number of animations (e.g., animation level) may have an inverse relationship with the processing speed of the application and/or mobile device. For example, an application set to a demonstration mode (e.g., high animation level) may experience a slower processing speed than the application set to a low animation level. As another example, but not a limitation, a food order that is input with three input events on a user interface may be processed faster than a food order that is input with four input events and three animations.

A baseline animation level (e.g., initial number of animations at a given time) of the application and/or the applet may be pre-defined by an application developer, application service provider, a user, and/or a sub-user of the application. For example, an application may be provided to a user in a demonstration (demo) mode. In the demo mode, the application may activate a high number of animations, in order to demonstrate to the merchant the capabilities of the application. In such an example, the user, once familiar with the animations and the capability of the application, may adjust the animation setting to a new baseline level. For another example, an employee of a merchant may set a baseline animation level based on an experience level of the employee. Thus, an experienced employee who may not need the extra information provided by the animation may prefer to set a baseline animation to a low level, thereby increasing the application processing speed.

At 104, the application determines to increase a processing speed (e.g., the merchant is busy, there are multiple customers awaiting transactions, there are multiple employees simultaneously processing transactions, an Internet connection is week and/or slow). In various examples, the determination to increase processing speed may be predictive. In such examples, the application and/or a data store of the mobile device may store user information (e.g., known busy times of the day, week, month and/or year, a user type, a user location, sub-user information, etc.), and may vary animations based on the determination to adjust the processing speed of the application. For example, a restauranteur's mobile device may store information indicating an increase in transactions between 4 pm and 6 pm. The application may thus schedule a decrease in animations at or near 4 pm in order to increase application processing speed during happy hour. For another example, a merchant application may store information indicating that Black Friday is a busy shopping day. The application may thus schedule a decrease in animations on or before an opening time for the merchant on Black Friday. Thus, the merchant application may increase the processing speed during busy shopping times, allowing the merchant to process an increased number of transactions.

Additionally or alternatively, the determination to increase the processing speed may be reactive. In such examples, the determination to increase processing speed may be based on pre-determined user-action criteria (e.g., a rate of input events, input events over a period, a rate of transactions, an average time between transactions, a change in sub-user, etc.). In various examples, the user-action criteria may be determined based on a type of user, a location of the user, or other user information. In some examples, the user-action criteria may be determined by one or more user-specified criteria. In such examples, the user-specified criteria may be stored in a user profile, and may be updated by the user periodically.

In various examples, the application may monitor user-actions via the user interface to determine to increase a processing speed. For example, the application may calculate an input event rate, and may determine the input event rate exceeds a threshold number of touches per second per minute. For another example, the application may calculate a transaction rate (e.g., a number of times the application processes a transaction over a period) and determine that the transaction rate exceeds a threshold rate.

In various examples, the application may determine to increase the processing speed based on input from one or more components (e.g., a card reader, a camera, a sensor, etc.) internal and/or external to the mobile device. For example, an application may determine to increase the processing speed based on an amount of time between swipes or inserts of a payment instrument in a card reader coupled to a mobile device. For another example, an application may determine to increase the processing speed based on an amount of activity sensed via a camera and/or other sensors internal and/or external to the mobile device.

At 106, the application reduces the amount of animation (e.g., animation level) associated with the user interface in order to increase the processing speed of the application (e.g., to process a transaction faster). To reduce the amount of animation, or the animation level, the application may disable one or more animations associated with the application.

In various examples, the reduction of animation may be applied throughout an application. In some examples, the reduction of animation may be applet specific. In such examples, a reduction in the animation level of an applet may apply to one or more applets of the application, but may not apply to other applets of the application. For example, a merchant application with a hostess applet, a wait-staff applet, and a cook applet may reduce an animation level of the wait-staff applet and the cook applet, but may maintain the animation level of the hostess applet.

In some examples, the reduction of animation may be user-specific. Thus, depending on the user currently using the application (e.g., the user logged in as using the application), the reduction of animation may be a greater or lesser reduction. For example, an experienced employee may be confident in processing transactions with little or no animation. Thus, the reduction of animation may drop to zero when the experienced employee is operating the POS device. Conversely, a new employee may not be capable of processing transactions without a minimum amount of animation. Thus, the reduction of animation with the new employee may not be as significant as the reduction of animation with an experienced employee.

Additionally or alternatively, the reduction of animation may include a combination of one or more previously independent animations and/or displays. For example, for a merchant application, the reduction of animation may include combining a tip page and a signature page.

FIG. 1B continues the illustration of the process 100 and, at 108, the application determines to decrease the processing speed.

In various examples, the determination to decrease the processing speed may be predictive. In such examples, the application and/or a data store of the mobile device may store user information, and may vary animations based on the desire to adjust the processing speed of the application. For example, a restauranteur's POS device may store information indicating an increase in transactions between 4 pm and 6 pm. After a decrease in animation at or near 4 pm, the application may schedule an increase in animations (e.g., decrease in processing speed) at or near 6 pm in order to increase the amount of animation or chrome near the end of happy hour. The application may thus provide an enhanced user experience at a time when a processing speed may not be as important to the restauranteur as during a busy time of day. For another example, a merchant application may store information indicating that Black Friday is a busy shopping day. After decreasing animations to increase transaction processing capabilities during Black Friday, the application may schedule an increase in animations (e.g., decrease in processing speed) at or after a closing time for the merchant on Black Friday.

Additionally or alternatively, the determination to decrease the processing speed may be reactive. In such examples, the determination to decrease the processing speed may be based on pre-determined user-action criteria (e.g., a rate of input events, input events over a period, a rate of transactions, an average time between transactions, a change in sub-user, etc.). In various examples, the user-action criteria may be based on a type of user, a location of the user, or other user information. In some examples, the user-action criteria may be based on one or more user-specified criteria. In such examples, the user-specified criteria may be stored in a user profile, and may be updated by the user periodically.

In various examples, the application may monitor user-actions via the user interface to determine whether to increase animations. For example, the application may calculate an input event rate, and may determine the input event rate is less than a threshold number of touches per second per minute. For another example, the application may calculate a transaction rate (e.g., a number of times the application processes a transaction over a defined period) and determine that the transaction rate is less than a threshold rate.

In various examples, the application may receive input from one or more components internal and/or external to the mobile device to determine to increase animations. For example, a camera and/or other sensor may send an input of reduced activity in the area, resulting a determination to decrease a processing speed.

At 110, responsive to a determination to decrease a processing speed, the application may increase the amount of animation associated with the user interface. To increase the amount of animation, or the animation level, the application may enable one or more animations associated with the application. The one or more animations may be the same and/or different animations as those disabled at 106.

In various examples, the increase in animation may be applied throughout an application. In some examples, the increase in animation may be applet specific. In such examples, an increase in an animation level of the applet may apply to one or more applets of the application, but may not apply to other applets of the application. For example, a merchant application with a hostess applet, a wait-staff applet, and a cook applet may increase an animation level of the wait-staff applet and the cook applet, but may maintain the animation level of the hostess applet.

In some examples, the increase in animation may be user-specific. Thus, depending on the user operating the application on the mobile device (e.g., the user logged in as using the application), the increase in animation may be a greater or lesser reduction. For example, an experienced employee may be confident in processing transactions with little or no animation. Thus, the increase in animation may be at a lower level when the experienced employee is operating the mobile device. Conversely, the increase in animation with the new employee may be to a higher level than the increase in animation with an experienced employee.

Figure 2:
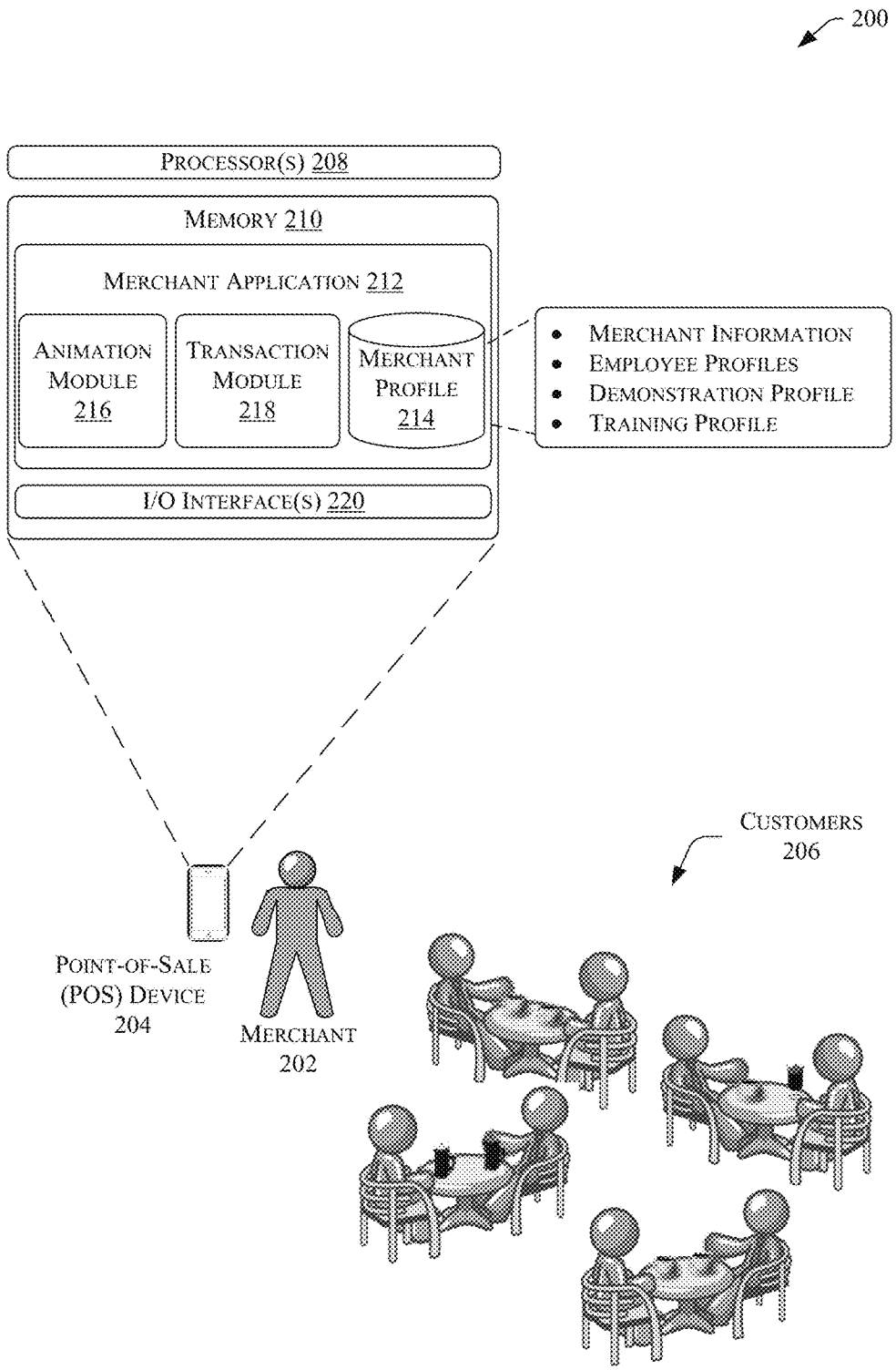
FIG. 2 illustrates an example environment that includes a merchant operating a mobile point-of-sale (POS) device to manage animations in a POS device application.

FIG. 2 illustrates an example environment 200 that includes a merchant 202 operating a point-of-sale (POS) device 204 to process transactions between the merchant 202 and one or more customers 206.

The POS device 204 may include one or more processors 208, which can represent, for example, a CPU-type processing unit, a GPU-type processing unit, a field-programmable gate array (FPGA), another class of digital signal processor (DSP), or other hardware logic components that can, in some instances, be driven by a CPU. Additionally, the POS device 204 may include a memory 210, which can store instructions executable by the processor(s) 208. In various examples, the POS device 204 may include a memory 210, which can store instructions executable by external processing units, such as, for example, by an external CPU-type processing unit.

The POS device 204 may comprise any sort of mobile or non-mobile device that includes an instance of a merchant application 212 that executes on the respective device. The merchant application 212 may provide POS functionality to the POS device 204 to enable the merchant 202 (e.g., an owner, employee, individual user, etc.) to accept payments from customers. In some types of businesses, the POS device 204 may correspond to a store or other place of business of the merchant, and thus, may be a fixed location that typically does not change on a day-to-day basis. In other types of businesses, however, the POS device 204 may change from time to time, such as in the case that the merchant operates a food truck, is a street vendor, a cab driver, etc., or has an otherwise mobile business, e.g., in the case of merchants who sell items at buyer's homes, places of business, and so forth.

As used herein, a merchant 202 may include any business engaged in the offering of goods or services for acquisition by customers. Actions attributed to a merchant 202 may include actions performed by owners, employees, or other agents of the merchant 202 and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants 202 may be referred to as items. Thus, a merchant 202 and a customer 206 may interact with each other to conduct a transaction in which the customer acquires an item from a merchant 202, and in return, the customer 206 provides payment to the merchant. A transaction may include a financial transaction for the acquisition of goods and/or services that is conducted between a customer 206 and a merchant 202.

In some examples, the merchant application 212 may comprise a merchant profile 214 configured to store merchant information (e.g., known busy times of the day, week, month and/or year, a merchant type, a merchant location, transaction history, and other information relevant to the merchant), sub-user information (e.g., profiles for employees of the merchant), a demonstration profile, a training profile, and other application data. In the illustrative example, the merchant profile 214 is stored in the merchant application 212 on a memory 210. In other examples, the merchant profile 214 may be stored in a separate data store on the memory 210 or a different memory on the POS device 204.

In various examples, the application 212 may include an animation module 216 and a transaction module 218. Though illustrated as two separate modules, it is understood that the application may combine the functionality of the two modules into one module and/or API, or split the functionality into a greater number of modules and/or APIs.

In various examples, animation module 216 may include logic to program the one or more processors 208 to present animations on a display of the POS device 204. The animations may comprise movements (e.g., sliding, fading in, fading out, dropping down, raising up, rotating, etc.), sounds, menus, and/or other information pertaining to the function and/or aesthetics of the application and/or applet. In various examples, the animations may provide information to the user and/or enhance a user experience of the POS device 204. Thus, the animations may be beneficial and desirable to the user. The number of animations (e.g., animation level), however, may have an inverse relationship with the processing speed of the application (e.g., time to process a transaction). For example, an application set to the demo mode (e.g., high animation level) may experience a slower processing speed than the application set to a low animation level. Thus, in some examples, to realize the benefit of the animations, the user may need to sacrifice some processing speed.

In various examples, the animation module 216 may set a baseline animation level. The baseline animation level may be determined by the application service provider (e.g., a transaction processing service), an application developer, and/or information stored in the merchant profile 214. The information affecting the baseline animation level may include a merchant type, an employee profile, a demonstration profile, and/or a training profile. For example, an experienced employee who may not need the extra information provided by the animation may prefer to set a baseline animation to a low level (e.g., less animation). For another example, a new employee may prefer to use a training profile with a high level of animation geared toward teaching as a baseline, in order to view more information through the animations, and/or to slow the transaction process.

In various examples, the animation module 216 may adjust the animation level from the baseline level to a second level. The second level may be lower (e.g., fewer animation) or higher (e.g., more animations). In various examples, the animation module 216 may adjust the animation level based on a recognized desire to increase a processing speed of the merchant application 212. The desire to increase the processing speed may be based on a known period of high transaction activity for the merchant, a recognized period of high transaction activity for the merchant, and the like. The animation module 216 may adjust the animation level in a predictive mode and/or a reactive mode.

In a predictive mode, the animation module 216 may determine that the time is approaching a known period of high transaction activity. In various examples, the known period of high transaction activity may be stored as merchant information in the merchant profile 214 (e.g., known busy times of the day, week, month and/or year). The known period of high transaction activity may be based on merchant input of known busy times, and/or a merchant type. For example, a coffee shop merchant profile may include a known period of high transaction activity from 7 am-10 am, Monday through Friday.

In some examples, the known period of high transaction activity may be based on transaction history. In such examples, the animation module 216 may monitor the transaction history over a period of time (e.g., day, week, month, year, etc.), and may determine that a transaction rate exceeded a threshold rate at a point in time and/or over a span of time during the period. The threshold rate may be determined by the application service provider, the application developer, and/or the merchant. Responsive to the determination of exceeding the threshold rate at the point in time and/or over the span of time, the merchant profile 214 may store the point in time and/or the span of time as a known period of high transaction activity.

In the predictive mode, the animation module 216 may decrease the animation level of the application and/or an applet of the application at or prior to the known period of high transaction activity. In various examples, the animation module 216 may disable one or more animations associated with the merchant application 212. In some examples, the animation module 216 may disable one or more animations of the applet of the merchant application 212, while maintaining the number of animations in other applets. In various examples, the animation module 216 may combine of one or more previously independent animations and/or displays. For example, for a merchant application, the reduction of animation may include combining a tip page and a signature page.

The number of disabled and/or combined animations may be based on multiple criteria, such as, for example, an employee using the device, a merchant type, a merchant input setting, a degree of known transaction activity. For example, a merchant operating a bar may have saved, in the merchant profile, known periods of high transactions between 4 pm and 6 pm, Monday through Friday, for happy hour, and Thursday evenings between 10 pm and 1 am. Because the Thursday evening crowd is more active than the happy hour crowd, the animation module and/or the merchant profile may recognize a higher transaction rate during the period of high transactions on Thursday evening. Consequently, the animation module may reduce more animations Thursday evening than it does during happy hour. For another example, a particular merchant may have set, in the merchant profile a busy transaction period level of animation. The merchant application associated with the particular merchant, via the animation module, may determine a known period of high transaction activity is approaching and may adjust the animation to the busy transaction period level of animation.

In some examples, the animation module 216 may disable some animations, but may maintain other animations determined to be important to the merchant 202. As such, certain animations may be maintained even during known periods of high transaction activity. In some examples, the animations that are important to the merchant 202 may be stored in the merchant profile 214 as set by the application service provider, the application developer, and/or the merchant. Additionally or alternatively, one or more tasks of the application may maintain the animation level. For example, due to an increased likelihood of error while splitting tickets between multiple customers, a restauranteur application may maintain animations associated with a split ticket task to assist the user in correctly processing the split ticket transaction.

In various examples, the animation module 216 may adjust the animation level in the reactive mode. In such examples, the animation module 216 may adjust the animation level based on inputs from one or more input/output (I/O) interfaces 220. The I/O interfaces 220 can include peripheral input devices (e.g., a keyboard, a mouse, a pen, a game controller, a voice input device, a touch input device, a gestural input device, and the like).

In some examples, the animation module 216 may adjust the animation based on pre-defined user-action criteria associated with the I/O interfaces 220 (e.g., a rate of input events, input events over a period, a rate of transactions, an average time between transactions, a change in employee, etc.). In such examples, the user-action criteria may be stored in the merchant profile 214, and monitored by the animation module 216. In various examples, the user-action criteria may be based on the type of user, a location of the user, Internet connection speed, and/or other user information. For example, a particular merchant type may include a threshold rate of input events such that if a number of input events per second per minute exceeds the threshold, the animation module disables one or more animations. For another example, the user-action criteria, such as a rate of transactions threshold, may change based on an Internet connection speed. Thus, if the Internet connection speed drops below a threshold, the rate of transaction threshold may be lower than with a faster Internet connection speed.

In various examples, the application service provider and/or the application developer may determine the user-action criteria, such as the threshold rate of input events or rate of transactions. In some examples, the user-action criteria may be based on one or more user-specified criteria. In such examples, the user-specified criteria may be stored in the merchant profile and may be updated by the user. For example, the merchant may input a threshold rate of input events, rate of transactions, an average time between transactions and various other user-action criteria as desired.

In various examples, the animation module 216 may adjust the animation level of the merchant application 212 based on instructions from an application service provider. In such examples, the application service provider may send instructions via a network interface, for the animation module 216 to increase and/or decrease the animation level of the merchant application 212. The application service provider may determine an animation adjustment in a predictive and/or reactive manner. For example, the application service provider may store a merchant profile with transaction history data, and may determine that a period of known high transaction activity is approaching. Based on the determination, the application service provider may send an instruction to the animation module 216 to decrease the animation level.

In various examples, the animation module 216 may monitor the merchant application 210 to determine that the merchant application 210 may increase the animation level (e.g., decrease the processing speed). The determination to increase the animation level may be based on recognizing that a known period of relatively high transaction activity has passed and/or by monitoring user-actions via the I/O interfaces 220. For example, the animation module 216 may calculate an input event rate and/or a transaction rate, and may determine the input event rate and/or the transaction rate is less than a threshold number of touches per second per minute. For another example, the animation module 216 may recognize that the known period of high transaction activity was from 4 pm to 6 pm, and a current time is after 6 pm.

Based on the determination to increase animation level, the animation module 216 may enable one or more animations. In various examples, the animation module 216 may resume the baseline animation level for the merchant and/or the employee. In some examples, the animation module 216 may set an animation level above and/or below the baseline animation level.

In various examples, the increase in animation level may be incremental, such that animation level adjusts over time. In such examples, the animation module 216 may increase animations by engaging one or more animations periodically until the desired number of animations are capable of being presented. For example, an application may have a reduced animation level of 2 and a baseline animation level of 6. An animation module corresponding to the application may increase the animation level to 3 for a first period of time, then to 4 for a second period of time, and then to five for a third period of time, before reaching the baseline animation level of 6.

As illustrated in FIG. 2, the POS device 204 may include a transaction module 218. In various examples, the transaction module 218 may include logic to program the one or more processors 208 to process transactions between the merchant 202 and one or more customers 206. In some examples, the transaction module 218 may receive transaction information (e.g., payment amount, payment type (e.g., credit card, debit card, gift card, cash), card number tip, split ticket, etc., and may process the transaction accordingly. For example, a merchant may input a number of a payment instrument (e.g., credit card, debit card, gift card, etc.) associated with the customer. The input may be manual, or electronic through a magnetic strip card reader, a chip card reader, a proximity device, and the like. Based on the input, the POS device may send the transaction information to a payment service to complete the transaction. The payment service may send an approval for the transaction to the POS device, and the merchant and the customer may complete the transaction.

Figure 3:
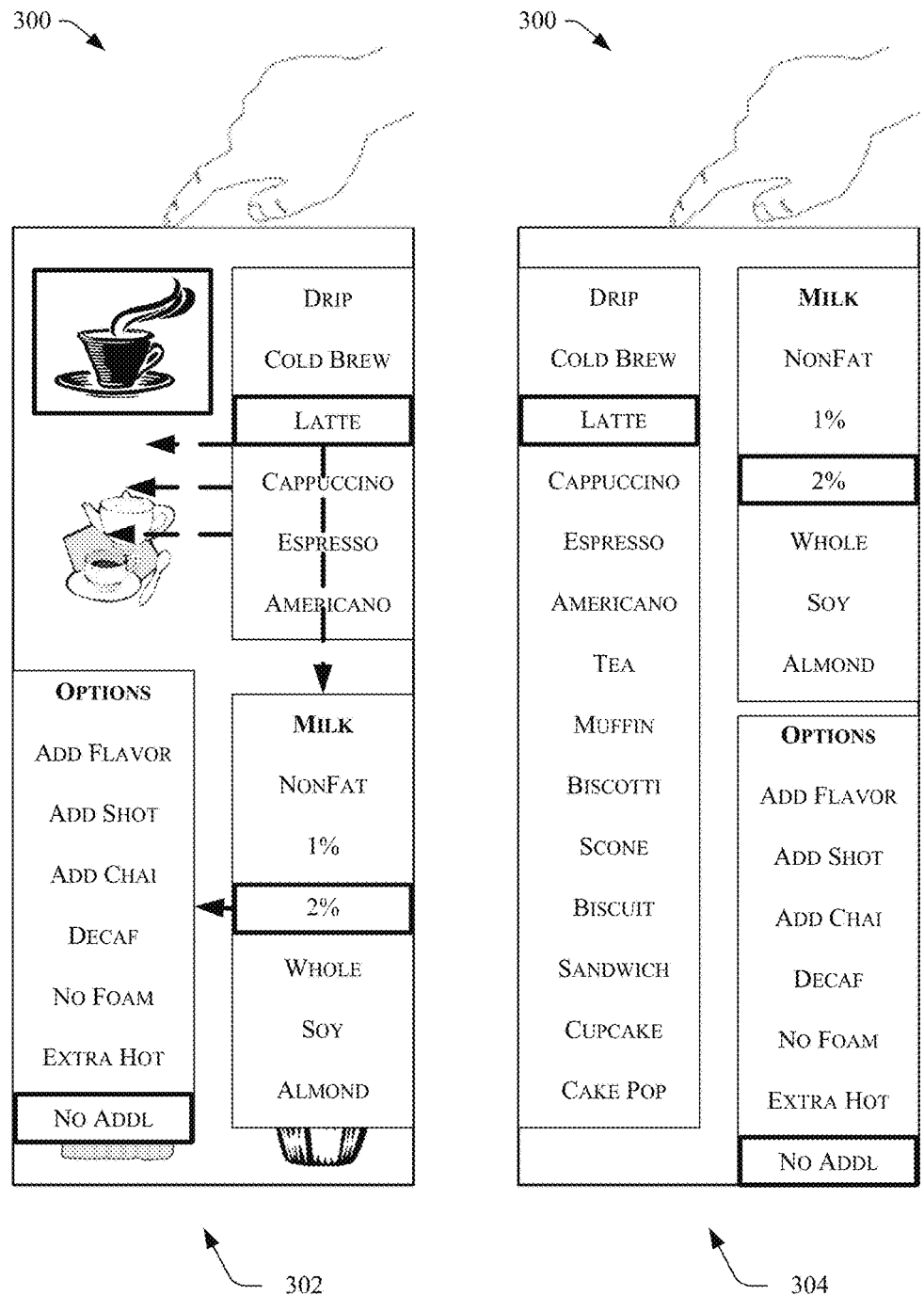
FIG. 3 illustrates an example display of a point-of-sale (POS) device with a touch-screen user interface presenting two levels of animation in an application.

FIG. 3 illustrates an example display 300 of a POS device with a touch-screen user interface presenting two levels of animation in an application. In the illustrative example, the application is a merchant application for processing transactions between a coffee shop merchant and one or more customers.

At 302, the display 300 operates at a first animation level. In some examples, the first animation level may be a baseline animation level. The baseline animation level may be based on a type of merchant, an employee of the merchant operating the POS device, or other factors. The first animation level may be a number of animations enabled for display in the application and/or an applet of the application. The animations may comprise movements of graphical items (e.g., sliding, fading in, fading out, dropping down, raising up, rotating a graphical icon, graphical menus, or other items), sounds, and/or other information pertaining to the function and/or aesthetics of the application and/or applet.

A user (e.g., an employee of the merchant) may tap the display 300 while the display is operating at the first animation level. In the illustrative example, the first tap is on an icon, indicating that a customer would like a coffee. In response to the first tap, a first animation may be presented on the display. In the illustrative example, the first animation slides in from a right hand side of the display and comprises a coffee menu. In other examples, the first animation may comprise any other movement of the coffee menu.

The user may select the coffee desired by the customer, such as a latte, which may trigger a second animation. In the illustrative example, the second animation slides down to a space below the first menu and comprises a milk menu for the latte. The user may then select the desired milk, which may trigger a third animation. As illustrated, the third animation slides to a left hand side of the screen and comprises additional options for the latte. Therefore, in the illustrative example, the coffee order may include the processing time associated with four taps by the user, and three animations. In other examples, the baseline animation level may comprise more or less animations of a similar or a different type of animation.

At 304, the display 300 operates at a second animation level. In various examples, the second animation level may be set based on one or more criteria stored in a merchant profile and/or determined by an application service provider and/or an application developer. The second animation level may include fewer animations than the first animation level, thereby increasing a processing speed of the application. In some examples, the adjustment to the second animation level may include disengaging one or more animations. In various examples, the second animation level may include combining one or more previously independent animations and/or displays. For example, for a merchant application, the second animation level may include combining a tip page and a signature page.

As illustrated in FIG. 3, the second animation level results in the animation module disabling the movement of various menus across the display 300. Additionally or alternatively, the second animation level may result in the animation module disabling one or more sounds or other animations associated with the merchant application.

The user may tap the display 300 while the application is operating at the second animation level, to select various options. In the illustrative example, the second animation level setting includes three menus displayed on the screen 300. The user selects a latte with 2% milk for the customer with no additional options. The processing time for the coffee order while the application is operating at the second animation level may be the time required for the user to tap the display three times. Because the coffee order at 304 requires only three taps to process, the processing time of the coffee order at 304 may be less than that at 302, which included the time for four taps and three animations.

Figure 4:
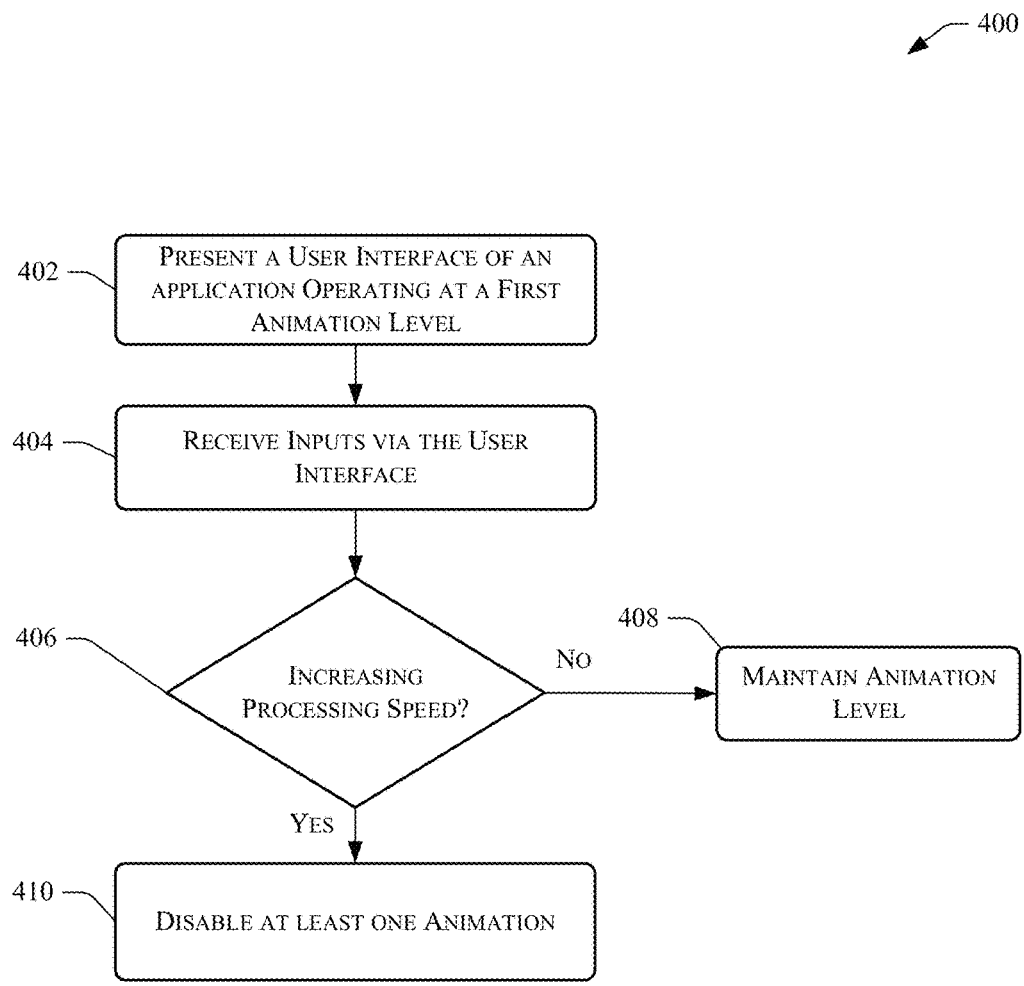
FIG. 4 illustrates a flow diagram of a process for managing animations of an application on a computing device.
Figure 5:
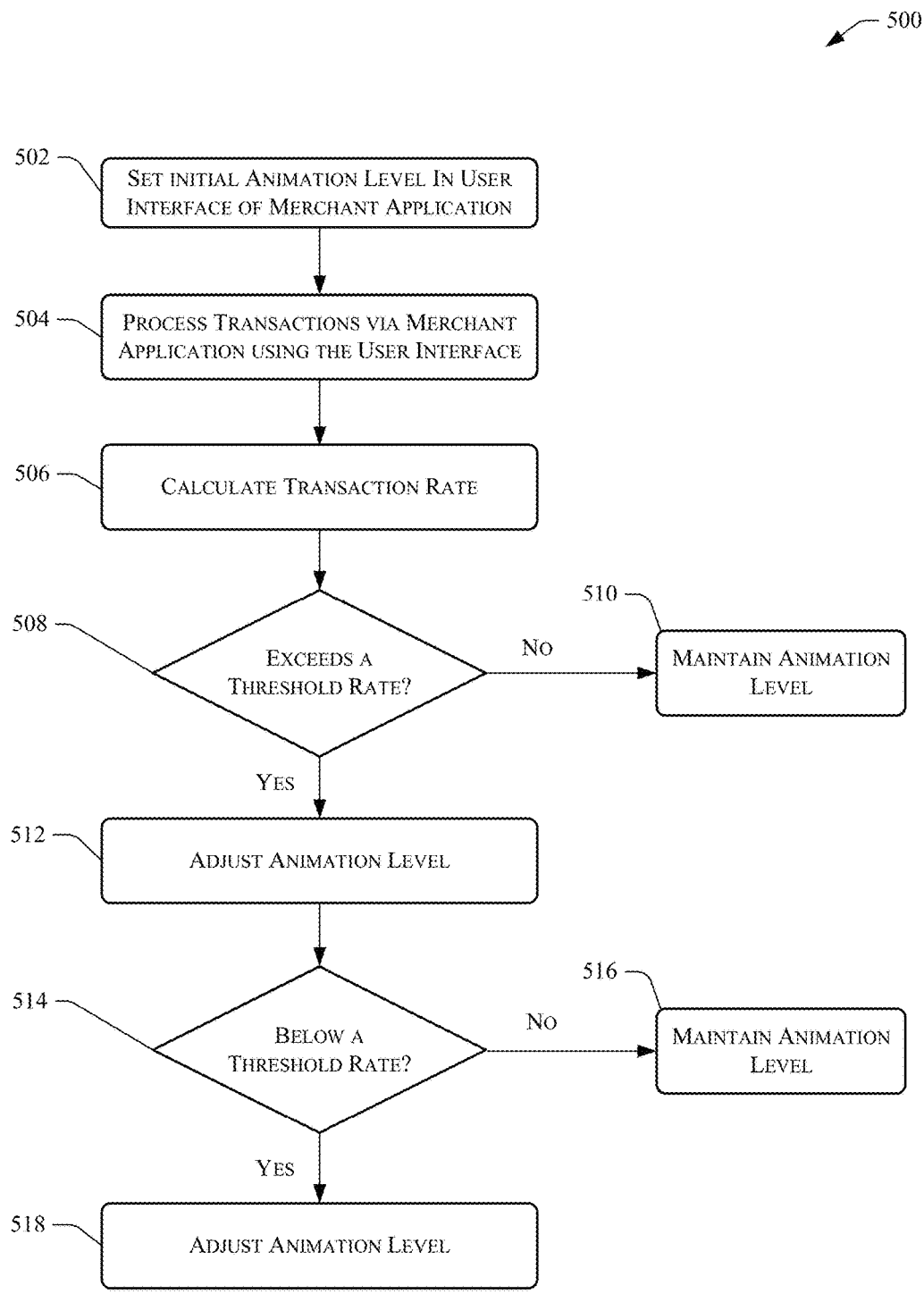
FIG. 5 illustrates a flow diagram of a process for managing animations of an application on a computing device.
Figure 6:
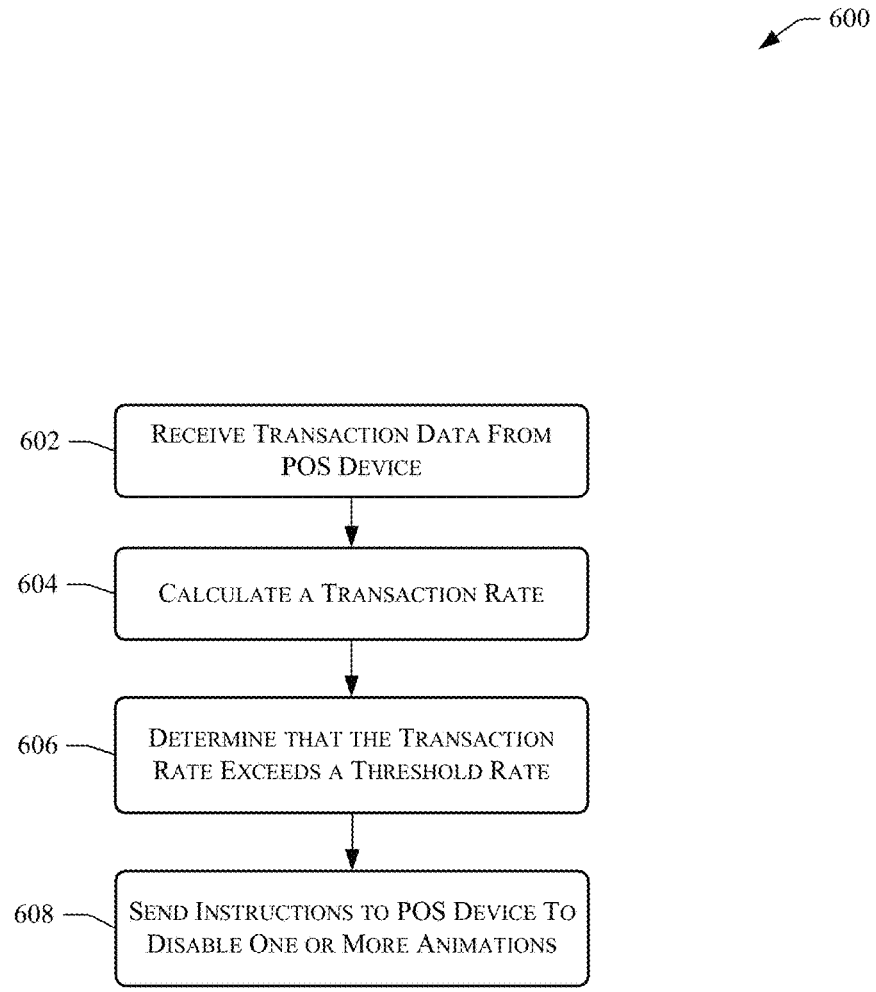
FIG. 6 illustrates a flow diagram of a process for managing animations on a device by a transaction processing service.

FIGS. 4-6 illustrate flow diagrams of processes for presenting animations of an application operating on a computing device. Processes 400, 500, and 600 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need to be executed. For discussion purposes, the processes are described with reference to the environments, architectures and systems described in the examples herein, although the processes may be implemented in a wide variety of other environments, architectures and systems.

FIG. 4 illustrates a flow diagram of a process 400 for managing animations of an application on a computing device. At 402, a device, such as a POS device, presents a user interface of an application operating at a first animation level. In various examples, the user interface may comprise a touch-screen interface presented on a display of the device. In some examples, the user interface may comprise a cursor of external input device, such as a keyboard or a mouse, on the display of the device.

In various examples, the first animation level may be a baseline animation level. The baseline animation level may be based on a type of merchant, an employee of the merchant operating the device, or other factors. The first animation level may be a number of animations enabled for display in the application and/or an applet of the application. The animations may comprise movements of graphical items (e.g., sliding, fading in, fading out, dropping down, raising up, rotating a graphical icon, graphical menus, or other items), sounds, and/or other information pertaining to the function and/or aesthetics of the application and/or the applet.

At 404, the device may receive inputs via the user interface. The inputs may be input events (e.g., taps), clicks of a mouse or other input device, and/or other inputs indicating a selection.

At 406, the device may determine whether to increase a processing speed. In various examples, the device may monitor one or more parameters associated with the user interface and/or the application, and, based on the one or more parameters, may determine whether to increase the processing speed (e.g., the application may be able to process more transactions). In various examples, the determination may be based on a calculation of a transaction rate, an input event rate, input from a component of the device and/or a second device, or other parameter rate associated with the application. In some examples, the determination may be based on a known period of high usage of the application, such as a known period of high transaction activity.

At 408, the device determines to not increase the processing speed, and maintains the animation level. The determination to not increase the processing speed may be based on a failure of a parameter rate to exceed a threshold value. The threshold values may be determined by the user (e.g., the merchant), an application developer, and/or the application service provider. In various examples, the threshold values may be saved to a user profile, and updated by the user and/or the application service.

At 410, the device determines to increase the processing speed, and consequently disables one or more animations associated with the application. The determination to increase the processing speed may be based on a parameter rate exceeding a threshold and/or a determination of an approaching period of high usage of the application.

In various examples, the device may disable some animations while maintaining other animations. In some examples, the animations which are maintained may be deemed important to the user and/or the application, such as those deemed important for accuracy of use.

In some examples, the device may disable animations based on an amount of exceedance a parameter rate. In such examples, the device may disable a first set of animations for a parameter at or slightly above the threshold value, whereas the device may disable a second set of animations (e.g., a higher number of animations) for the parameter at a higher amount (e.g., at or above a threshold amount) above the threshold value.

FIG. 5 illustrates a flow diagram of a process 500 for managing animations of an application on a computing device.

At 502, the device sets an initial animation level in a user interface of a merchant application. In various examples, the initial animation level may be a baseline animation level. The initial animation level may be determined by merchant information stored on a merchant profile, including, but not limited to, a merchant type, an employee profile, a baseline desired processing speed, a demonstration level, and a training profile.

At 504, the device may process transactions via the merchant application using the user interface. The transaction processing may include calculating an order, providing a total amount due for the order, receiving payment information, calculating change, and/or communicating with a transaction processing service for transaction approval.

At 506, the device may calculate a transaction rate over a period. The period may comprise 5 minutes, 10 minutes, 15 minutes, 30 minutes, or another interval of time as determined by a user, the application, an application developer, and/or the application service provider.

At 508, the device determines if the transaction rate exceeds a threshold rate for the application and/or an applet of the application. The threshold rate may be determined by the merchant, the application, the application developer, and/or the application service provider. In various examples, the threshold rate may be saved in the merchant profile. In such examples, the threshold rate may be based on the employee operating the device. Additionally, the threshold rate may be updated by the merchant, an employee of the merchant, and/or the application service.

At 510, the device determines that the transaction rate does not exceed a threshold, and maintains the animation level.

At 512, the device determines that the transaction rate does exceed a threshold rate, and adjusts the animation level. In various examples, the device adjusts the animation level by disabling one or more animations. In various examples, the animation level may be adjusted based on the amount of exceedance of the threshold rate. In some examples, the animation level may be adjusted to a pre-determined animation level. In such examples, the adjustment may include disabling a pre-determined set and/or number of animations.

In various examples, information about the animation level adjustment may be saved in the merchant profile. The information may include a pre-determined set of animations to disable, animations to not disable, employee information (e.g., a minimum number and/or set of animations necessary for the employee to process transactions), etc.

At 514, the device determines whether the transaction rate has dropped below the threshold rate.

At 516, the device determines that the transaction rate has not dropped below the threshold rate (e.g., still exceeds the threshold rate), and maintains the reduced animation level.

At 518, the device determines the transaction rate has dropped below the threshold rate, and adjusts the animation level. In various examples, the device may adjust the animation level to the initial animation level. In some examples, the device may adjust the animation level to a baseline level for the employee operating the device.

In various examples, the device may adjust the animation level incrementally, such that animation level adjusts over time. In such examples, the animation level may increase animations by engaging one or more animations periodically until the desired number of animations are capable of being presented. For example, an application may have a reduced animation level of 2 and a baseline animation level of 6. An animation module corresponding to the application may increase the animation level to 3 for a first period of time, then to 4 for a second period of time, and then to five for a third period of time, before reaching the baseline animation level of 6.

FIG. 6 illustrates a flow diagram of a process 600 for managing animations on a mobile device by a transaction processing service.

At 602, a transaction processing service may receive transaction data from a POS device. The transaction data may include an amount of the transaction and payment instrument information.

At 604, the transaction processing service may calculate a transaction rate over a period. The period may comprise 5 minutes, 10 minutes, 15 minutes, 30 minutes, or another interval of time as determined by a user, the application, the application developer, and/or an application service provider.

At 606, the transaction processing service may determine that the transaction rate exceeds a threshold rate. The threshold rate may be a predefined number of transactions over a period, as set by the user, the application, the application developer, and/or the application service provider.

At 608, the transaction processing service may send instructions to the POS device to disable one or more animations associated with the application and/or an applet of the application. The animations of the one or more disabled animations may be determined by the user, the application, the application developer, and/or by the transaction processing service.

Figure 7:
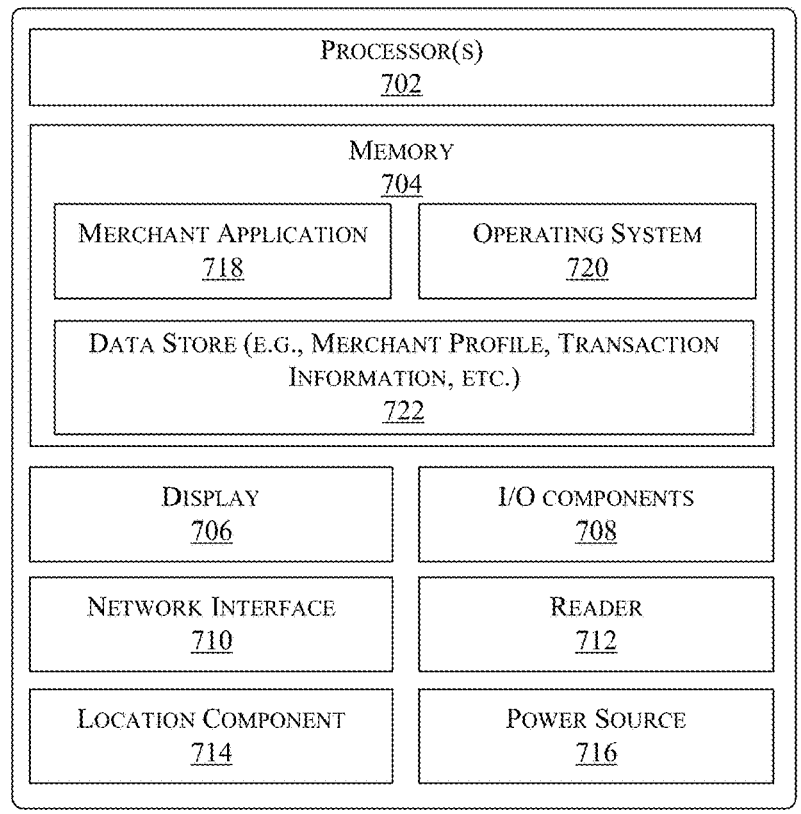
FIG. 7 illustrates example components of a POS device that a merchant may utilize.

FIG. 7 illustrates select example components of an example POS device 700 according to some implementations. The POS device 700 may be any suitable type of computing device, e.g., mobile, semi-mobile, semi-stationary, or stationary. Some examples of the POS device 700 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 700 includes at least one processor 702, which may be processor 208, at least one memory 704, such as memory 210, a display 706, one or more input/output (I/O) interfaces 708, such as I/O interfaces 220, one or more network interfaces 710, at least one card reader 712, at least one location component 714, and at least one power source 716. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the memory 704.

Depending on the configuration of the POS device 700, the memory 704 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 704 may include, but is not limited to, RAM, ROM, EEPROM, flash memory, solid-state storage, magnetic disk storage, optical storage, and/or other computer-readable media technology. Further, in some cases, the POS device 700 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702. Further, when mentioned, non-transitory computer-readable media exclude media such as energy, carrier signals, electromagnetic waves, and signals per se.

The memory 704 may be used to store and maintain any number of functional components that are executable by the processor 702. In some implementations, these functional components comprise instructions or programs that are executable by the processor 702 and that, when executed, implement operational logic for performing the actions and services attributed above to the POS device 700. Functional components of the POS device 700 stored in the memory 704 may include a merchant application 718, discussed above. The merchant application 718 may present an interface on the POS device 700 to enable the merchant to conduct transactions, select items, display animations, receive payments, and so forth, as well as communicating with a payment service for processing payments and sending transaction information. Further, the merchant application 718 may present an interface to enable the merchant to manage a merchant profile 712, a merchant account, and the like. Additional functional components may include an operating system 720 for controlling and managing various functions of the POS device 700 and for enabling basic user interactions with the POS device 700. The memory 704 may also store transaction data 722 that is received based on the merchant associated with the POS device 700 engaging in various transactions with customers. The memory 704 may also store various animation levels of the merchant application 718, such as a demonstration animation level, training animation levels, baseline animation levels, minimum animation levels, and the like.

In addition, the memory 704 may also store data, data structures and the like, that are used by the functional components. For example, this data may include item information that includes information about the items offered by the merchant, which may include images of the items, descriptions of the items, prices of the items, and so forth. Depending on the type of the POS device 700, the memory 704 may also optionally include other functional components and data, which may include programs, drivers, etc., and the data used or generated by the functional components. Further, the POS device 700 may include many other logical, programmatic and physical components, of which those described are merely examples that are related to the discussion herein.

The one or more network interface(s) 710 may include one or more interfaces and hardware components for enabling communication with various other devices over the network or directly. For example, network interface(s) 710 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 7 further illustrates that the POS device 700 may include the display 706 mentioned above. Depending on the type of computing device used as the POS device 700, the display 706 may employ any suitable display technology. For example, the display 706 may be a liquid crystal display, a plasma display, a light emitting diode display, an OLED (organic light-emitting diode) display, an electronic paper display, or any other suitable type of display able to present digital content thereon. In some examples, the display 706 may have a touch sensor associated with the display 706 to provide a touchscreen display configured to receive touch inputs for enabling interaction with a graphical user interface presented on the display 706. Accordingly, implementations herein are not limited to any particular display technology.

The I/O interfaces 708, meanwhile, may include speakers, a microphone, a camera, and various user controls (e.g., buttons, a joystick, a keyboard, a keypad, etc.), a haptic output device, and so forth.

In addition, the POS device 700 may include or may be connectable to a payment instrument reader 712. In some examples, the reader 712 may plug in to a port in the merchant device, such as a microphone/headphone port, a data port, or other suitable port. In other instances, the reader 712 is integral with the entire POS device 700. The reader may include a read head for reading a magnetic strip, a chip and/or a proximity sensor of a payment card, and further may include encryption technology for encrypting the information read from the magnetic strip, the chip and/or the proximity. Alternatively, numerous other types of card readers may be employed with the POS devices 700 herein, depending on the type and configuration of a particular POS device 700.

The location component 714 may include a GPS device able to indicate location information, or the location component 714 may comprise another other location-based sensor. The POS device 700 may also include one or more additional sensors (not shown), such as an accelerometer, gyroscope, compass, proximity sensor, and the like. Additionally, the POS device 700 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    causing display, on a screen of a merchant point-of-sale device, of a user interface of an application, the user interface including animations;
    receiving, by the merchant point-of-sale device and via the user interface, an input associated with a point-of-sale transaction;

generating input data corresponding to the input;

determining, based at least in part on the input data, to increase a speed at which one or more processors of the merchant point-of-sale device process requests associated with the point-of-sale transaction; and based at least in part on the determining to increase the speed, disabling at least one of the animations.

2. The method as claim 1 recites, wherein the determining to increase the speed comprises determining to increase the speed based at least in part on:

calculating a rate of processing transactions over a period of time; and determining that the rate exceeds a threshold rate.

3. The method as claim 1 recites, wherein the determining to increase the speed comprises determining to increase the speed based at least in part on:

calculating a rate of processing input events over a period of time, individual ones of the input events including a selection via the user interface; and determining that the rate exceeds a threshold rate.

4. The method as claim 1 recites, wherein the determining to increase the speed is based at least in part on at least one of:

a time of day;
a day of a week;
a merchant location;
a merchant type;
a user profile associated with the merchant point-of-sale device; or
an applet of the application being displayed.

5. The method as claim 1 recites, wherein the application is configured to facilitate payment transactions between a merchant and a customer.

6. The method as claim 1 recites, further comprising, prior to causing display of the user interface, identifying an initial number of the animations for the user interface based at least in part on a merchant type.

7. The method as claim 1 recites, further comprising:
determining to decrease the speed at which the application processes requests; and
enabling, based at least in part on determining to decrease the speed, at least one of the animations.

8. The method as claim 1 recites, wherein individual ones of the animations include at least one of:
a picture;
a drop-down menu;
a sound; or
a response to an input event.

9. A system comprising:
one or more processors; and
one or more non-transitory computer-readable media storing instructions executable by the one or more processors, wherein the instructions program the one or more processors to perform acts comprising:
causing display, on a screen of a point-of-sale device, of a first number of animations via a user interface associated with an application;
receiving input data representing input associated with the user interface, the input associated with a point-of-sale transaction;
determining, based at least in part on the input data, to increase a speed at which the application causes a processor of the point-of-sale device to process requests; and
based at least in part on the determining to increase the speed, causing display of a second number of animations via the user interface, wherein the second number of animations is less than the first number of animations.

10. The system as claim 9 recites, wherein the determining to increase the speed is based at least in part on a time of day.

11. The system as claim 9 recites, wherein the determining to increase the speed is based at least in part on a user profile.

12. The system as claim 9 recites, wherein the determining to increase the speed comprises determining to increase the speed based at least in part on:
calculating a rate of processing the input data over a period of time; and
determining that the rate exceeds a threshold rate.

13. The system as claim 9 recites, wherein the acts further comprise:
processing transactions via the application; and
the determining to increase the speed comprises determining to increase the speed based at least in part on:
calculating a rate of processing the transactions over a period of time; and
determining that the rate exceeds a threshold rate.

14. The system as claim 9 recites, wherein the acts further comprise:
determining that the speed is above a threshold speed for the application; and
causing display of the first number of animations based at least in part on determining that the speed is above the threshold speed.

15. The system of claim 9, wherein causing display of the second number of animations comprises causing display of the second number of animations for a predetermined amount of time, and the operations further comprise:
determining that the predetermined amount of time has lapsed; and
causing display, based at least in part on determining that the predetermined amount of time has lapsed, of the first number of animations.

16. A system comprising:
one or more processors; and
one or more non-transitory computer-readable media storing instructions executable by the one or more processors, wherein the instructions program the one or more processors to perform acts comprising:
causing display, on a screen of a merchant point-of-sale device, of a user interface of an application, the user interface including animations;
receiving, by the merchant point-of-sale device, an input associated with a point-of-sale transaction via the user interface;
generating input data corresponding to the input;
determining, based at least in part on the input data, to increase a speed at which the one or more processors process requests; and
based at least in part on the determining to increase the speed, disabling at least one of the animations.

17. The system as claim 16 recites, the acts further comprising, prior to causing display of the user interface, identifying an initial number of the animations for display via the user interface based at least in part on a merchant type.

18. The system as claim 16 recites, the acts further comprising:
prior to causing display of the user interface, identifying an employee profile from a merchant profile database, the employee profile indicating an experience level of the employee; and identifying an initial number of the animations for display via the user interface based at least in part on the employee profile.

19. The system as claim 16 recites, wherein the application includes a first applet and a second applet, and the disabling the at least one of the animations includes disabling animations of the first applet and maintaining animations of the second applet as enabled.

20. The system as claim 16 recites, wherein the animations comprise at least one of an audio presentation or a visual presentation.

* * * * *